(12) United States Patent
Onmori

(10) Patent No.: US 7,420,777 B2
(45) Date of Patent: Sep. 2, 2008

(54) LEADER TAPE HAVING AN END WHICH IS CUT USING A MECHANICAL PROCESS SO AS TO BE STRONGLY SPLICED ONTO A MAGNETIC TAPE

(75) Inventor: Shozo Onmori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 300 days.

(21) Appl. No.: 11/057,147

(22) Filed: Feb. 15, 2005

(65) Prior Publication Data
US 2005/0189447 A1    Sep. 1, 2005

(30) Foreign Application Priority Data
Feb. 16, 2004    (JP)    ............................ 2004-038394

(51) Int. Cl.
*G11B 23/02*    (2006.01)

(52) U.S. Cl. ...................................... 360/132; 360/134
(58) Field of Classification Search ................. 360/132, 360/134; 156/159
See application file for complete search history.

(56) References Cited

U.S. PATENT DOCUMENTS

| 4,532,172 | A | * | 7/1985 | Fujiyama | ................. 428/847.1 |
| 6,030,542 | A | * | 2/2000 | Koide et al. | ................... 216/90 |
| 6,663,035 | B2 | * | 12/2003 | Shiga et al. | ............... 242/348.2 |

FOREIGN PATENT DOCUMENTS

JP    2000-11591 A    1/2000

\* cited by examiner

*Primary Examiner*—A. J. Heinz
(74) *Attorney, Agent, or Firm*—Sughrue Mion, PLLC (57) ABSTRACT

A leader tape to be spliced in a butting manner to a leading end of a magnetic tape, the leading end being mechanically cut in a tapered shape, wherein the leader tape has a surface roughness RZ (RZ complies with JIS B0601-1994) of 5 μm or less.

3 Claims, 7 Drawing Sheets

LEADER TAPE HAVING AN END WHICH IS CUT USING A MECHANICAL PROCESS SO AS TO BE STRONGLY SPLICED ONTO A MAGNETIC TAPE

This application is based on Japanese Patent application JP 2004-038394, filed Feb. 16, 2004, the entire content of which is hereby incorporated by reference. This claim for priority benefit is being filed concurrently with the filing of this application.

BACKGROUND OF THE INVENTION

1. Technical Field of the Invention

The present invention relates to a leader tape, a cutting method for a leading end of a leader tape, and a magnetic tape cartridge. More specifically, the invention relates to a processing of a leading end of a leader tape for strongly splicing the leader tape onto a magnetic tape wound around a single reel in a magnetic tape cartridge, and to a cutting method for the leading end to achieve the processing.

2. Description of the Related Art

As a magnetic tape cartridge used as a recording medium for a computer or the like, there has been known a magnetic cartridge configured such that a single reel, around which a magnetic tape is wound, is rotatably stored in a cartridge case constructed of an upper cartridge half and a lower cartridge half.

When in use, the magnetic tape cartridge is used such that a magnetic tape is drawn out through an opening of the cartridge case. When the magnetic tape cartridge is not in use, in a state that the magnetic tape is completely wound around a reel, a leader tape (engagement means which is engaged to engagement means disposed in a device, such as a computer, for guiding the magnetic tape to a tape path of the device) which is spliced to one end of the magnetic tape is fixed to an end face of a cartridge case and also fixed by locking means such as a reel lock so as to prevent unexpected rotation. The opening is closed by a lid which is attached openable and closable.

Figure 6:
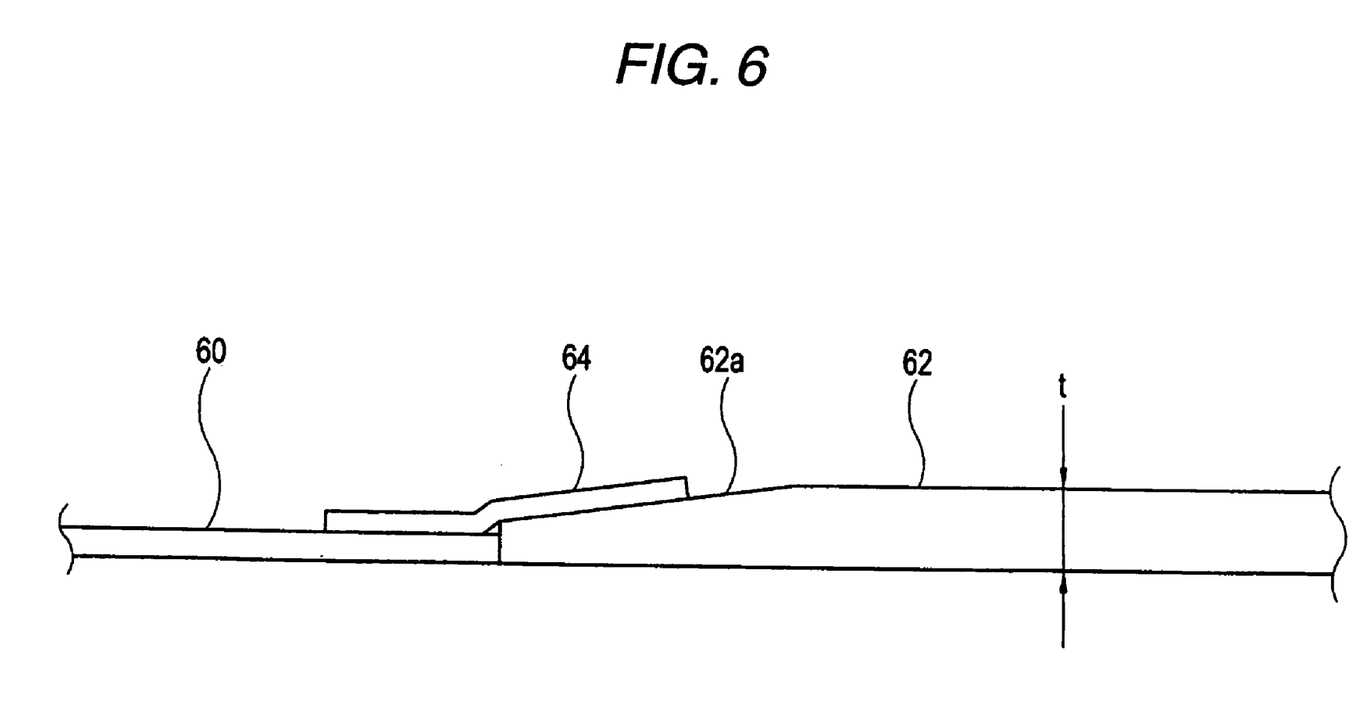
FIG. 6 is a side view showing a state where a leader tape is spliced on one end of a magnetic tape.

FIG. 6 is a side view showing a state where a leader tape is spliced onto one end of a magnetic tape. As shown in FIG. 6, one end of the magnetic tape 60 is spliced to the leader tape 62 made from polyethylene terephthalate (PET) by means of a splicing tape 64. The leader tape 62 has a thickness "t" when in a state of a material tape, which is a state before being subjected to predetermined processing; however, a taper processing of tapering down the thickness "t" is performed on a section 62a on the side close to the magnetic tape 60 so as to assure splicing to the magnetic tape 60 by means of the splicing tape 64. Since a remarkable step is not formed on a splicing section between the leader tape 62 and the magnetic tape 60 by virtue of the tapered section, stable running of the magnetic tape is also enabled.

Meanwhile, two methods have hitherto been proposed for application of a taper processing to a PET material tape having the thickness "t" to thus manufacture the leader tape 62.

One is a method to process the tapered section through chemical processing by means of etching, and the other is a method to process the tapered section through mechanical cutting.

The former chemical processing by means of etching is advantageous in that the finished surface is free from roughness, and free from fear that a cutting burr protrudes out from an end of the leader tape. However, since the chemical processing requires processes, such as chemical coating, cleaning, and drying, time required for the processing becomes long. In addition, inclusion of the plurality of processes results in decrease in productivity. Furthermore, high cost in the chemical processing has resulted in a cost increase.

The second method of mechanical cutting is performed such that, as described in JP-A-2000-11591, a leading end of a leader tape is mechanically cut to a tapered shape by means of rotating a cylindrical end mill in a state inclined at a certain angle in relation to a rotation axis of the roller.

Figure 7:
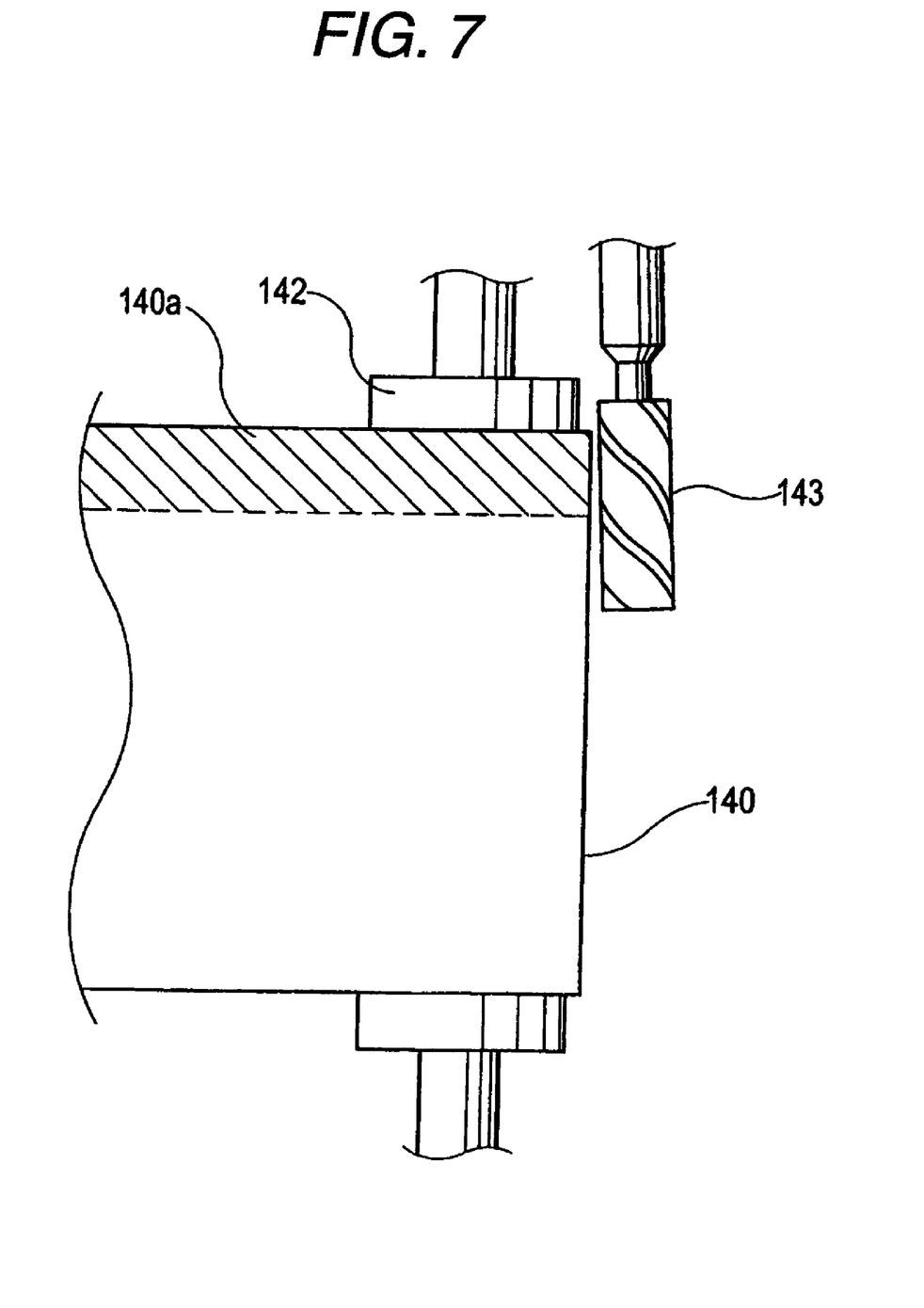
FIG. 7 is a view for explaining a cutting method making use of an end mill and a metal roller described in JP-A-2000-11591.

FIG. 7 is a view showing a metal roller and an end mill performing the mechanical cut method described in JP-A-2000-11591. In the drawing, reference numeral 140 denotes a material tape, 140a indicated by a hatched pattern denotes a to-be-cut section, 142 denotes a metal roller, and 143 denotes a cylindrical end mill.

As shown in the drawing, the to-be-cut section 140a indicated by a hatch pattern is mechanically cut to a tapered shape by the cylindrical end mill 143; and a rotation axis of the end mill 143 is not parallel to a rotation axis of the metal roller 142 but is inclined by a certain angle. By means of setting the angle appropriately and moving the end mill 143 in the direction for the material tape, the to-be-cut section 140a on the material tape 140 can be taper-cut by a desired amount.

As described above, processing of the tapered section on the material tape (i.e., the leader tape) 140 by a mechanical method is advantageous in that time required for processing can be shortened and cost can be reduced in comparison with a taper processing by means of chemical processing.

However, a leader tape obtained with use of such a general cutting technique has a surface roughness RZ which is as large as 8 μm or more (RZ complies with JIS B0601-1994). The inventor has realized that this surface roughness may result in protrusion of a cutting burr or the like from an end of the leader tape, and the thus-protruding cutting burr will come off by being scratched, thereby rendering harm to other components.

SUMMARY OF THE INVENTION

An object of the invention is to provide a processing method for leading end of leader tape which enables elimination of a variety of processes which have been performed during chemical processing, such as chemical coating, cleaning, and drying, to thus shorten time required for processing and to reduce cost, and, moreover, without causing an increase in surface roughness.

The object of the invention can be attained by the following means:

(1) A leader tape to be spliced in a butting manner to a leading end of a magnetic tape, the leading end being mechanically cut in a tapered shape, wherein a surface roughness RZ (RZ complies with JIS B0601-1194) falls within a range of $RZ \leq 5$ μm.

According to the leader tape of (1), surface roughness RZ falls within the range of $RZ \leq 5$ μm. Therefore, an optimum splicing strength is obtained.

(2) A leader tape leading end cutting method for mechanically cutting a leading end of a magnetic tape into a tapered shape by means of an end mill, wherein the end mill is an end mill of two-blade type, three-blade type, or four-blade type.

According to the invention on a cutting method of leading end of leader tape of (2), an end mill having from two to four blades is used instead of one with a spirally continuing single blade (hereinafter referred to as spirally continuing blade). Consequently, a requirement that the surface roughness RZ of the leader tape falls within the range of $RZ \leq 5$ μm is satisfied.

(3) The leader tape leading end cutting method of (2), wherein the leader tape is transferred at about 1.0 to 2.0 m/minute, and the end mill is rotated at about 10,000 to 20,000 rpm.

According to the invention of (3), the leader tape is processed so as to have a surface roughness of 5 µm or less; that is, whereby an optimum splicing strength can be obtained. (4) A magnetic tape cartridge comprising the leader tape according to (1); a single magnetic tape reel; and a magnetic tape whose one end is spliced to the leader tape and whose other end is wound around the single magnetic tape reel.

According to the invention of (4), by means of using the leader tape of (1), a magnetic cartridge which enables strong splicing to a magnetic tape can be obtained.

BRIEF DESCRIPTION OF THE DRAWINGS

FIGS. 3A to 3B(2) are views for explaining a cutting method making use of an end mill and a metal roller according to the invention.

FIGS. 4A to 4C are conceptual views showing three methods for subjecting ends of leader tapes to taper processing, and processing results thereof, wherein

FIGS. 5A and 5B are schematic views explaining that surface roughness of 5 µm or less is optimum, wherein

DETAILED DESCRIPTION OF THE INVENTION

Hereinafter, a best embodiment of the invention will be described in detail by reference to the drawings.

Figure 1:
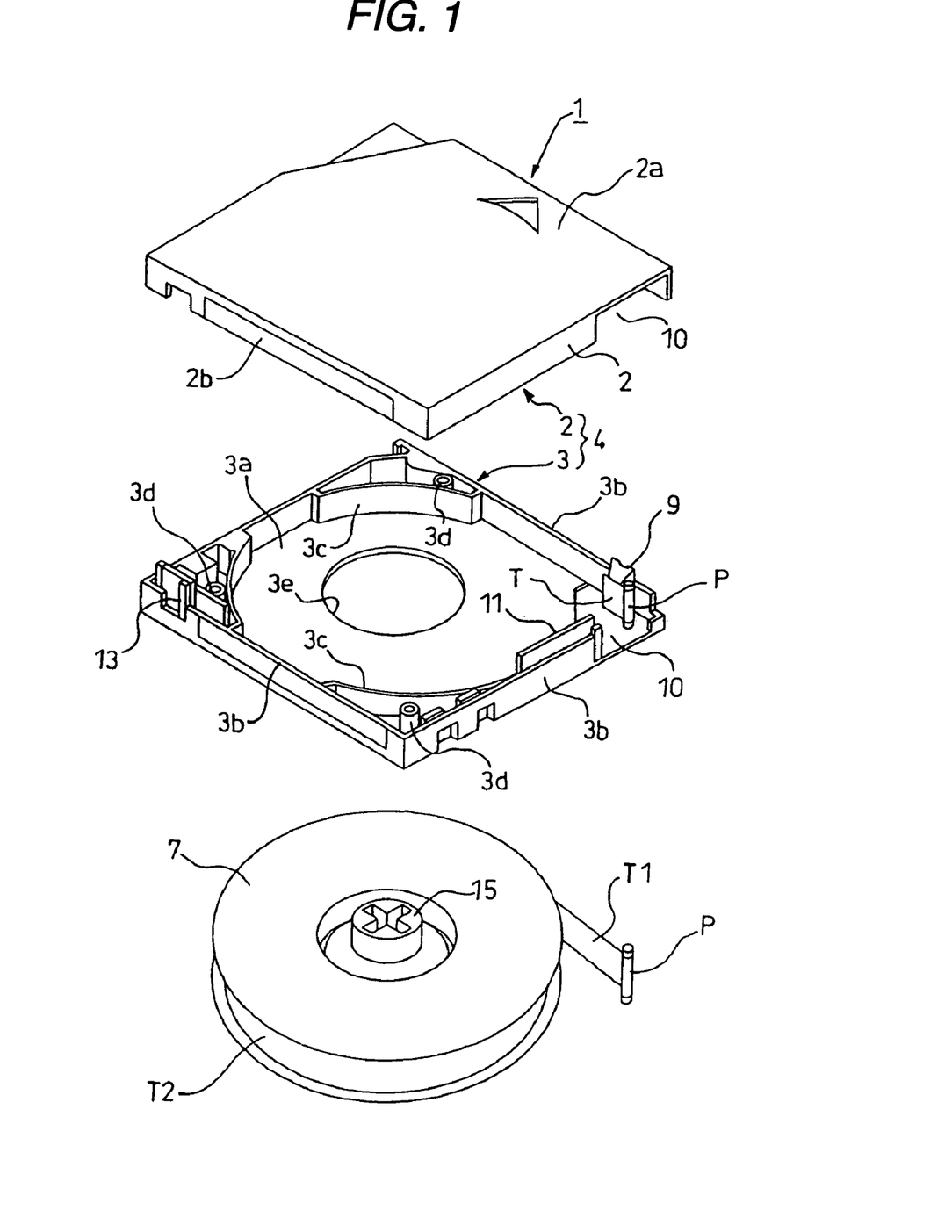
FIG. 1 is an exploded perspective view showing an embodiment of a magnetic tape cartridge according to the present invention.

FIG. 1 is an exploded perspective view showing an embodiment of a magnetic tape cartridge according to the invention. In the figure, in a magnetic tape cartridge 1 comprising a cartridge case 4 unified into a single body by fastening an upper case 2 to a lower case 3 by means of four small screws, a single reel 7 which rolls a leader tape T1 having a leader pin P melt-bonded by ultra-sonic wave at its leading end and a magnetic tape T2 splice-bonded to the rear end of the leader tape is accommodated in a rotatable manner. The upper and lower cases 2 and 3 each is shaped substantially rectangular, and at a pre-determined position of side walls 2b and 3b surrounding the circumferences of an upper wall 2a and a lower wall 3a, an opening 10 is provided for the purpose of pulling out the leader tape T1. This opening 10 is configured openable and closable by a slide door 11 pushed toward a closing direction by means of a spring (not shown in the figure). Further, in the vicinity of the opening 10, a groove-shaped door rail (not shown) is formed which permits the slide door 11 to slide therein.

Inside the cartridge case 4, an arc-shaped inner wall 3c (not shown for the upper case 2) is arranged along the outer circumference of the reel 7. The lower case 3 is bonded to the upper case 2 by bringing four bosses 3d (the one near the opening 10 being hidden behind the slide door 11) provided between the above-cited side wall 3b and inner wall 3c of the lower case 3 into contact with the bosses of the upper case 2 and fasten small screws from the bottom side of the lower case 3 under a superimposed state.

In addition, in the central portion of the above-cited lower case 3, a center hole 3e is opened which is for rotary driving of the above-cited reel 7 with a driving axis of a driving unit, and at the back end of the cartridge case 4, a write protector member 13 for write-in prevention is arranged in a slidable manner. Still further, at the central portion of the above-cited reel 7, a rotation-restraining mechanism 15 that restricts the rotation of the reel 7 in non-working state.

Further, though not shown in the figure, a reel plate is attached at the central portion of the bottom plate of the reel 7 for the purpose of adsorptively holding a magnet-based rotary driving means, and at the outer circumferential portion, a reel gear is formed that is engaged with the drive gear of the rotary driving means. By way of precaution, in the condition where the reel gear is connected with the drive gear, the above-cited rotation-restraining mechanism 15 is released to make the reel 7 freely rotatable.

Next, by reference to FIG. 2, a manufacturing method of the leader tape will be described.

Figure 2:
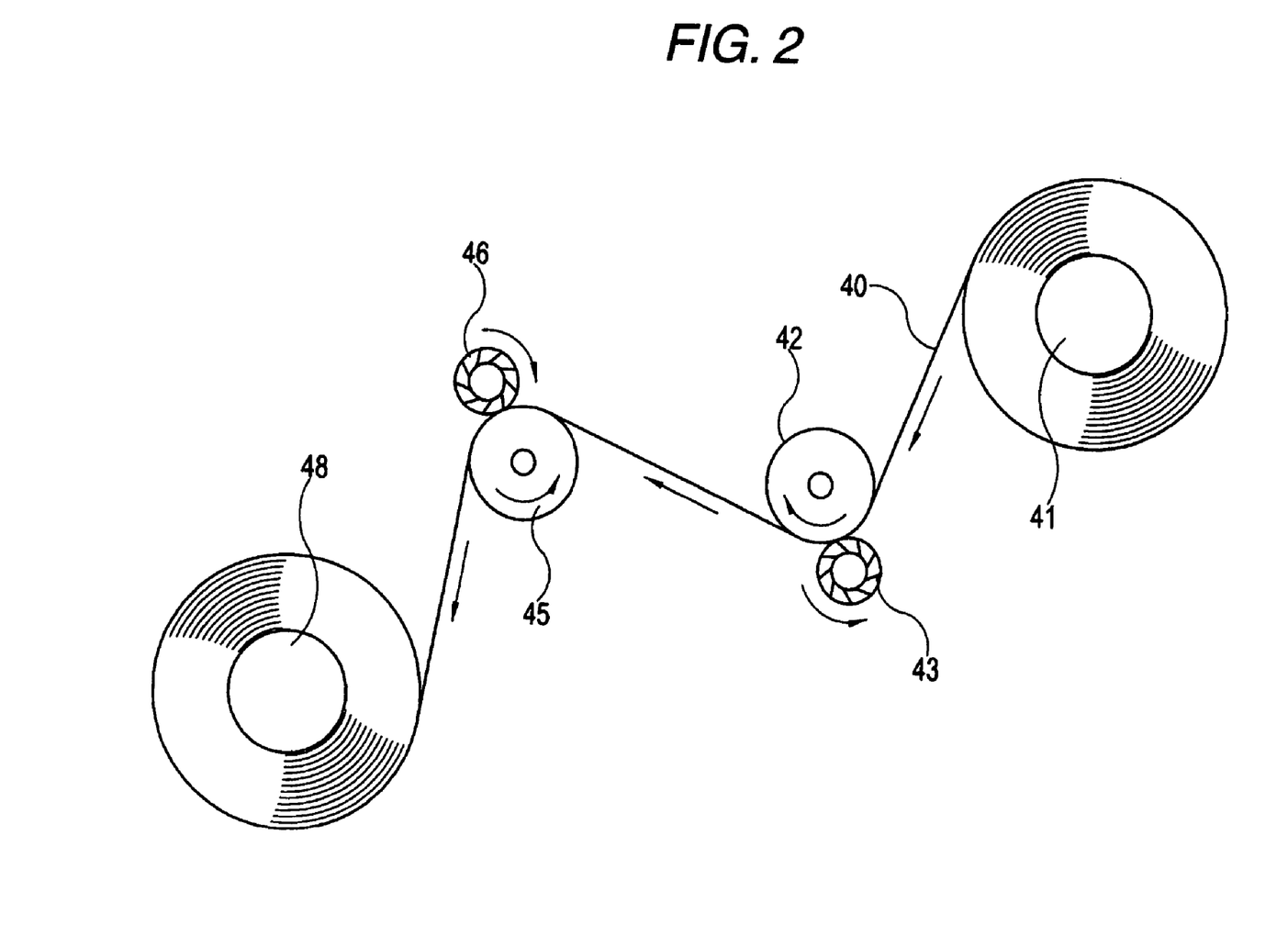
FIG. 2 is a schematic view for explaining a manufacturing method of a leader tape.

As shown in FIG. 2, a PET material tape 40 having a thickness greater than that of the magnetic tape is wound around a feed roller 41. The material tape 40 fed from the feed roller 41 passes between a first metal roller 42 and a first end mill 43 first, subsequently passes between a second metal roller 45 and a second end mill 46, and finally is wound up by a wind-up roller 48.

To perform cutting of a to-be-cut section of the material tape, rather than cutting in a longitudinal dimension precisely, setting a rather large cut portion in the longitudinal direction and adjusting the dimension by means of press-cut at a final pressing stage is a better method.

Furthermore, other than the process shown in FIG. 2, there can also be performed a continuous process where a cleaning roller is disposed after a taper-cut process of the to-be-cut section by the second end mill, whereby the surface of the material tape is cleaned, and press-cutting is performed immediately thereafter.

Figure 3A:
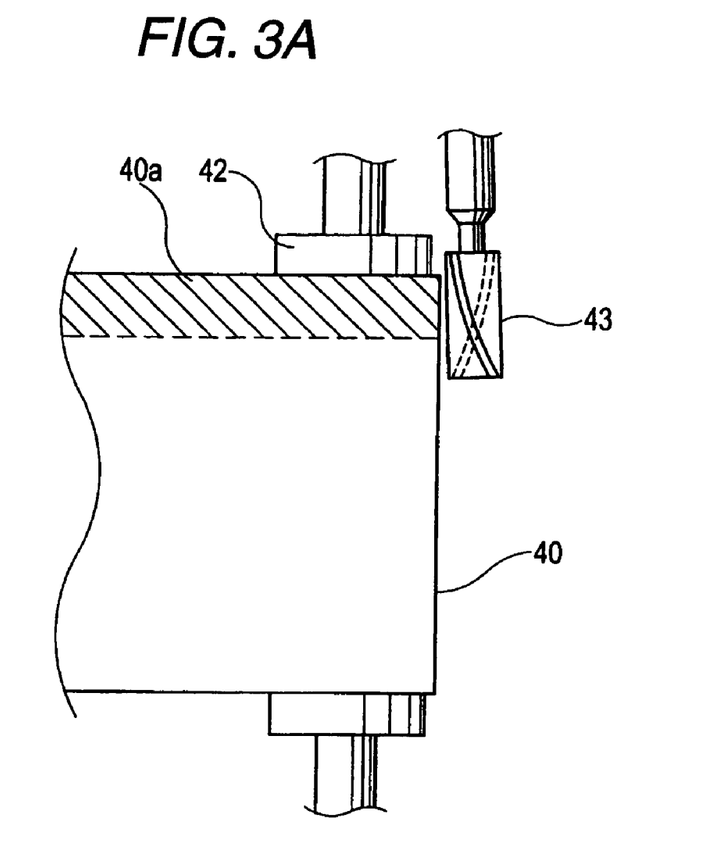
Figure 3B:
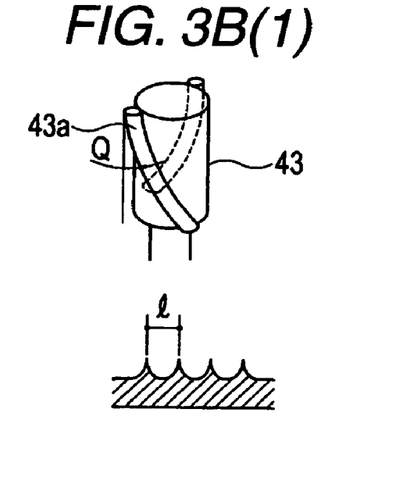

FIGS. 3A to 3B(2) are views showing a metal roller and an end mill executing the mechanical cutting in accordance with the method of the invention. FIG. 3A is a view showing a general arrangement thereof, and FIGS. 3B(1) and 3B(2) are descriptive views of the end mill according to the invention. In the drawings, reference numeral 40 denotes the material tape, 40a denotes a to-be-cut section indicated by a hatched pattern, 42 denotes the metal roller, 43 denotes the cylindrical end mill according to the invention, and Q denotes a rake angle.

As shown in FIG. 3A, the to-be-cut section 40a indicated by the hatched pattern is mechanically cut into a tapered shape by the cylindrical end mill 43; and a rotation axis of the end mill 43 is not parallel to a rotation axis of the metal roller 42, but is inclined by a certain angle. By means of setting the angle appropriately and moving the end mill 43 in the direction for the material tape, the to-be-cut section 40a of the material tape 40 can be taper-cut by a desired amount.

The end mill according to the invention is a two-blade end mill 43 shown in FIG. 3B(1), a three-blade end mill as non-illustrated, or a four-blade end mill 43' shown in FIG. 3B(2), which is different from a related art end mill having a spirally continuing blade shown in FIG. 7. When such an end mill is used, a leader tape having peaks and valleys at a fixed pitch on a cut section is obtained. The pitch between peaks on a cut section cut by the four-blade end mill 43' is L/2. As is obvious, the pitch L/2 is half of L, which is a pitch between peaks on a cut section cut by the two-blade end mill 43. The pitch between peaks on a cut section is determined by a relative speed between a feed speed of the material tape 40 and the rotation speed of the end mill 43.

Here, an end mill of two-blade type, three-blade type, four-blade type is used, the material tape (i.e., the leader tape) 40 is transferred at about 1.0 to 2.0 m/minute, and the end mill is rotated at about 10,000 to 20,000 rpm. When such a condition is employed, in both the case where the two-blade end mill is used and the case where the four-blade end mill is used, surface roughness RZ of the cross-sections indicated by a hatched pattern in the lower drawings is found to fall within the range of RZ≦5 μm.

Figure 4A:
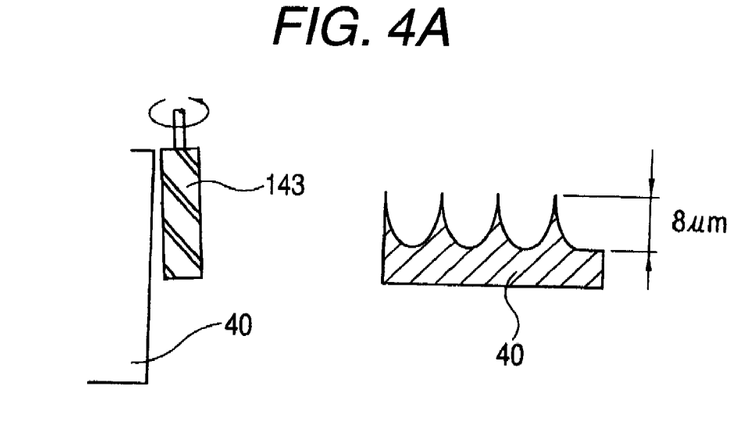
FIG. 4A shows a taper processing making use of a related art spirally continuing blade shown in FIG. 7.
Figure 4B:
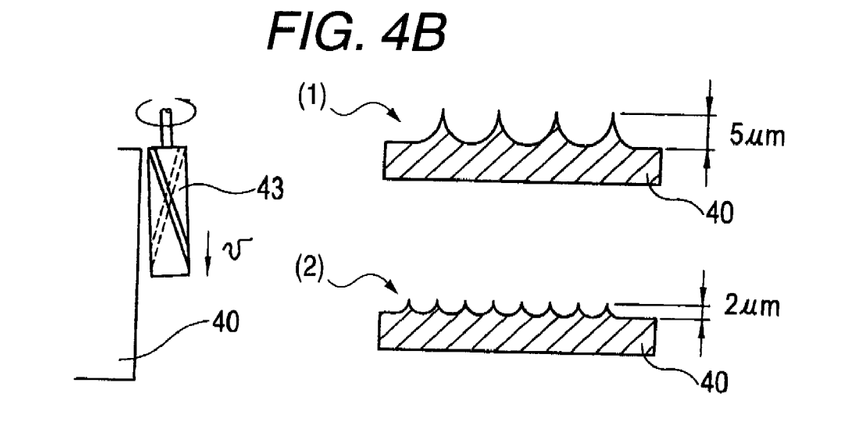
FIG. 4B shows a taper processing making use of end mills according to the invention shown in FIGS. 3A and 3B.
Figure 4C:
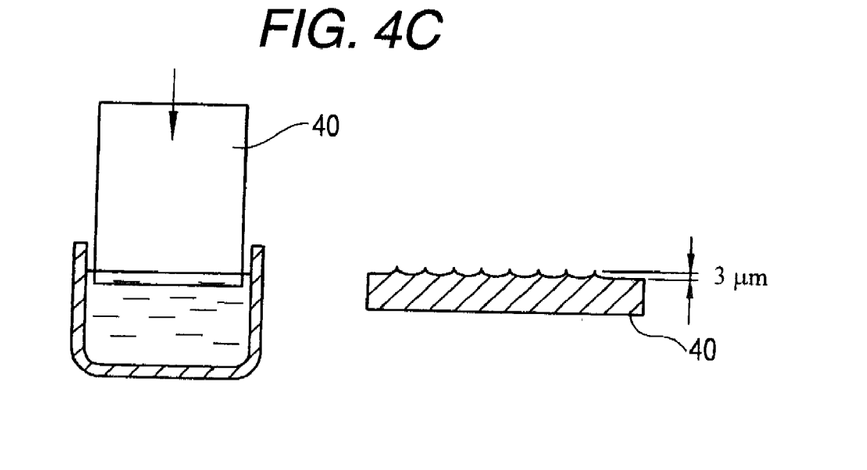
FIG. 4C shows a taper processing by means of a related art chemical processing.

FIGS. 4A to 4C are schematic views showing three methods for subjecting ends of leader tapes to taper processing, and processing results thereof. FIG. 4A shows a taper processing with use of a related art spirally continuing blade shown in FIG. 7. FIG. 4B shows a taper processing with use of end mills according to the invention shown in FIG. 3. FIG. 4C shows a taper processing by means of a related art chemical processing.

As shown in FIG. 4A, when the material tape 40 is transferred at about 1.0 to 2.0 m/minute, the end mill rotates at about 10,000 to 20,000 rpm, and the end mill is rotated at approximately 15,000 rpm, the processing result of surface roughness RZ of about 8 μm is obtained by use of the related art spirally continuing blade 143. When the surface roughness RZ is in the neighborhood of 8 μm, small burrs caused by being pressed at the time of splicing protrude outward from the end of the leader tape, which is not preferable. As has been known, the surface roughness can be reduced when the feed speed of the material tape is decreased; however, this is not favorable from the viewpoint of productivity. In consideration of productivity, feed speed of the material tape is desirably approximately 1.5 m/minute.

FIG. 4 is a view showing processing results with use of a two-blade end mill and a four-blade end mill according to the invention. (1) of FIG. 4 shows the processing result obtained when the two-blade end mill is rotated at approximately 15,000 rpm, and the material tape 40 is transferred at approximately 1.5 m/minute. (2) of FIG. 4 shows the processing result obtained when the four-blade end mill is rotated at approximately 30,000 rpm, and the material tape 40 is transferred at approximately 1.5 m/minute.

Surface roughness RZ is 5 μm in (1) of FIG. 4, and 2 μm in (2) of FIG. 4.

In addition, when the two-blade end mill is rotated at approximately 30,000 rpm and the material tape 40 is transferred at approximately 1.5 m/minute, surface roughness RZ is 2 μm. When the four-blade end mill is rotated at approximately 15,000 rpm, and the material tape 40 is transferred at approximately 1.5 m/minute, surface roughness RZ is 5 μm.

Consequently, it has been found that the most favorable surface roughness RZ is 5 μm or less (the reason thereof will be described later by reference to FIGS. 5A and B).

FIG. 4C shows a method of soaking the material tape 40 into etching solution to thus perform taper processing. Surface roughness RZ of about 3 μm is obtained from the processing result; however, as a result of study, the inventor has found that the roughness pattern on the surface formed by the etching erosion lacks in adhesion as compared with a surface formed by cutting, and there are other factors which cannot be determined by only small surface roughness RZ (the reason therefor will be described later by reference to FIGS. 5A and 5B).

Figure 5A:
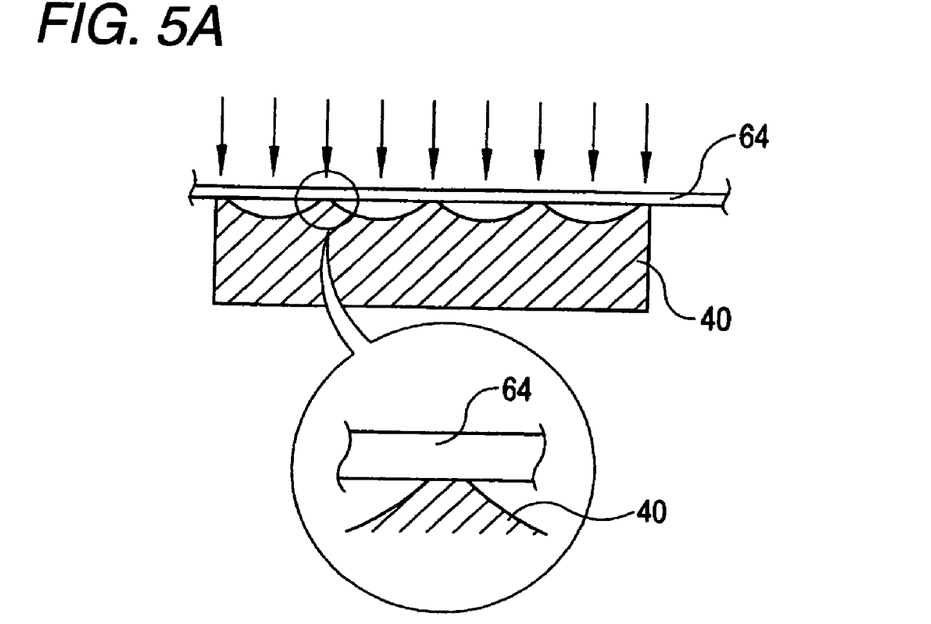
FIG. 5A shows a case of taper processing performed with use of chemical processing which produces a surface roughness RZ of 1 µm or less.
Figure 5B:
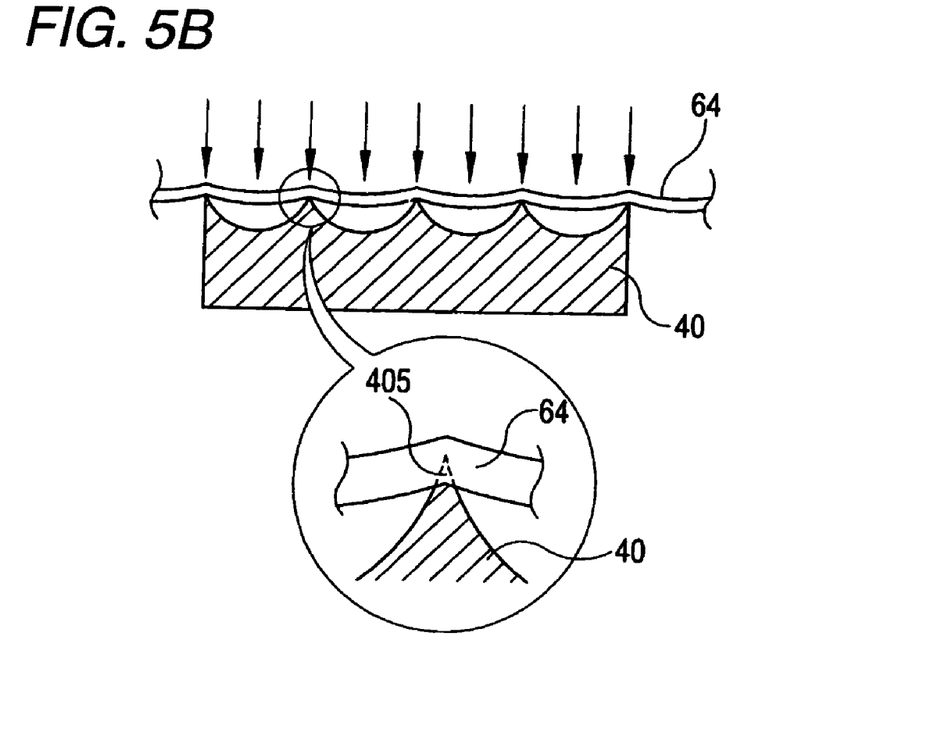
FIG. 5B shows a case of taper processing according to the invention which produces a surface roughness RZ of 5 µm or less.

FIGS. 5A and 5B are schematic views explaining that the range of 5 μm or less is optimum for surface roughness RZ applied to an end of the leader tape. FIG. 5A shows a case of taper processing performed by use of chemical processing and which produces a surface roughness RZ of about 1 μm. FIG. 5B shows a case of taper processing according to the invention and which produces a surface roughness RZ of 5 μm or less.

In the case of the leader tape 40 having surface roughness RZ of about 1 μm shown in FIG. 5A, as a result of being subjected to chemical processing, the surface lacks serration. Accordingly, even when the surface is covered with a splice 64 and spliced, relationship due to physical engagement between the leader tape 40 and the splice 64 (such an engagement that a leading end of the leader tape 40 sticks into the splice 64) is not established. Furthermore, since the peaks and valleys of the leader tape 40 are small, a contact area between the leader tape 40 and the splice 64 is small. Consequently, it has been found that strong bonding strength and durability cannot be obtained.

Meanwhile, in the case of the leader tape 40 having surface roughness RZ of 5 μm or less shown in FIG. 5B, the peaks and valleys on the surface are high and low and the peaks are pointed. Accordingly, when the leader tape 40 is covered with the splice 64 and spliced, a peak section 405 at the tip of the leader tape 40 sticks into the splice 64, thereby enhancing strength of mechanical bonding therebetween. In addition, since the peaks and valleys of the leader tape 40 are high and low, a contact area therebetween becomes large. Consequently, it has been found that strong bonding strength and durability can be obtained.

In addition, when the surface roughness RZ is about 8 μm, which is obtained with use of the related art spirally continuing blade 143, the peaks and valleys on the surface are further larger than in the case of the leader tape 40 having such a surface roughness RZ as shown in FIG. 5B, and sufficient bonding strength and durability can be obtained. However, in contrast, small burrs are caused by the leader tape being pressed at the time of splicing and protrude outward from the end of the leader tape, which must be avoided. Thus, as a comprehensive result, the leader tape having surface roughness RZ of about 8 μm is inferior to the leader tape having surface roughness of 5 μm or less.

Furthermore, even when surface roughness RZ is decreased by means of chemical processing, bonding strength and durability have been found to be insufficient; and there are other factors which cannot be determined only by surface roughness RZ (that is, the surface has serration). Ultimately, it has been found that a surface roughness of 5 μm or less in terms of RZ attained by the cutting process associated with the present invention is the most suited since the process can achieve a surface roughness equivalent to that attained by the etching method in current practice.

Therefore, according to the invention, a leading end of a leader tape 40 is caused to have surface roughness RZ of 5 μm or less. More specifically, this is achieved by means of using an end mill of two-blade, three-blade type, or four-blade type rather than a spirally continuing blade, transferring the leader tape at approximately 1.5 m/minute, and rotating the end mill at approximately 15,000 rpm.

As a method to perform taper processing by means of cutting, there has hitherto been described a method wherein a substantially cylindrical end mill performs taper processing in a state inclined at a certain angle in relation to a rotation axis of the roller supporting a material tape. However, there may be adopted a method wherein taper processing is applied to the end mill per se, and cutting of the material tape is performed with use of the tapered section.

Furthermore, as the result of such a taper processing, thickness of the leading end of the leader tape is tapered down; however, general thickness of a leader tape is approximately 100 to 200 µm, which is considerably thicker than that of a magnetic tape. Accordingly, even when the taper processing is applied, the thickness is gradually tapered down to only 2 to 10 times that of a magnetic tape. When the difference in thickness is converged to this level, desired effects can be exerted.

The invention is not limited to the hitherto-mentioned embodiments, and can be modified, improved, and the like as required within the scope of the invention. For instance, a shape of the end mill for cutting the taper section is not limited to the aforementioned shape, and use of an end mill having a stepped tip section in an inclined position or the like is also applicable.

As described above, according to the invention, a leader tape to be engaged with engagement means of a device is spliced in a butting manner to a leading end of a magnetic tape, and a leading end of the leader tape is mechanically cut so as to have a surface roughness of 5 µm or less. Accordingly, a variety of processes which have been applied during a related art chemical processing, such as chemical coating, cleaning, and drying can be eliminated, whereby time required for processing can be shortened and cost can be reduced.

What is claimed is:

1. A leader tape to be spliced in a butting manner to a leading end of a magnetic tape, a leading end of the leader tape being mechanically cut having a tapered shape, wherein the leader tape has peaks and valleys formed on a surface such that a roughness RZ of the surface is 5 µm or less.

2. A magnetic tape cartridge comprising: the leader tape according to claim 1; a single magnetic tape reel; and a magnetic tape whose one end is spliced to the leader tape using a splice and whose other end is wound around the single magnetic tape reel.

3. The leader tape of claim 2, wherein the peaks of the leader tape stick into the splice thereby enhancing strength of mechanical bonding therebetween.

* * * * *